US010450995B2

(12) United States Patent
Kimura et al.

(10) Patent No.: US 10,450,995 B2
(45) Date of Patent: Oct. 22, 2019

(54) CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Shingo Kimura, Hitachinaka (JP); Tomoaki Horii, Hitachinaka (JP); Mitsuru Nagase, Hitachinaka (JP); Shirou Yamaoka, Hitachinaka (JP); Ryo Kusakabe, Hitachinaka (JP); Takaki Itaya, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/547,973

(22) PCT Filed: Jan. 29, 2016

(86) PCT No.: PCT/JP2016/052565
§ 371 (c)(1),
(2) Date: Aug. 1, 2017

(87) PCT Pub. No.: WO2016/125688
PCT Pub. Date: Aug. 11, 2016

(65) Prior Publication Data
US 2018/0023503 A1    Jan. 25, 2018

(30) Foreign Application Priority Data
Feb. 5, 2015    (JP) .................................. 2015-020821

(51) Int. Cl.
*F02D 41/40*    (2006.01)
*F02D 41/20*    (2006.01)
(Continued)

(52) U.S. Cl.
CPC ............. *F02D 41/40* (2013.01); *F02D 41/20* (2013.01); *F02D 41/402* (2013.01); *F02D 41/26* (2013.01);
(Continued)

(58) Field of Classification Search
CPC ...... F02D 2200/50; F02D 41/26; F02D 41/40; F02D 41/401; F02D 41/402; F02D 41/20;
(Continued)

(56) References Cited

U.S. PATENT DOCUMENTS 3,549,132 A * 12/1970 Haase ...................... F02M 1/00
  261/23.2
6,133,714 A * 10/2000 Hoffmann ........... F02D 41/2096
  310/317
(Continued)

FOREIGN PATENT DOCUMENTS

JP    09-317540 A    12/1997
JP    2000-054932 A    2/2000
(Continued)

OTHER PUBLICATIONS 180619 2006 Capacitors and Inductors—Chaniotakis and Cory.*

*Primary Examiner* — Carl C Staubach
(74) *Attorney, Agent, or Firm* — Foley & Lardner LLP

(57) ABSTRACT

Provided is a control device for an internal combustion engine, the control device enabling the suppression of variations in the amount of fuel injected by injection while the boost voltage is charging, without offsetting the injection timing. A boost circuit (211) boosts a first voltage supplied from a battery (201), and supplies a boosted second voltage to a fuel injection device (214). Switches (212, 213) switch the second voltage supplied to the fuel injection device from the booster circuit on and off. Computation devices (204, 207) control the switches. Each computation device com-
(Continued)

prises: an estimation unit that, before the initial fuel injection in a combustion cycle, estimates the second voltage for all of the fuel injection times in the combustion cycle; and a correction unit that corrects the amount of fuel injected for each fuel injection time depending on the estimated second voltage.

10 Claims, 9 Drawing Sheets

(51) Int. Cl.
*F02D 41/26* (2006.01)
*F02M 69/04* (2006.01)

(52) U.S. Cl.
CPC ........... *F02D 2041/2003* (2013.01); *F02D 2041/2051* (2013.01); *F02D 2041/2058* (2013.01); *F02D 2200/0602* (2013.01); *F02D 2200/50* (2013.01); *F02M 69/046* (2013.01); *Y02T 10/44* (2013.01)

(58) Field of Classification Search
CPC ........... F02D 41/2003; F02D 41/2006; F02D 41/201; F02D 41/2017; F02D 41/2013; F02D 41/2051; F02D 2041/2048
USPC ............................................. 123/490
See application file for complete search history.

(56) References Cited

U.S. PATENT DOCUMENTS

| | | | | |
|---|---|---|---|---|
| 6,250,286 | B1* | 6/2001 | Hoenig | F02D 41/20 123/490 |
| 6,532,940 | B1* | 3/2003 | Ono | F02D 41/20 123/490 |
| 8,783,230 | B2* | 7/2014 | Okonogi | F02D 41/20 123/478 |
| 9,322,354 | B2* | 4/2016 | Nishida | F02D 41/20 |
| 9,777,667 | B2* | 10/2017 | Fukuda | F02D 41/32 |
| 2009/0243574 | A1* | 10/2009 | Mayuzumi | F02D 41/20 323/282 |
| 2011/0220067 | A1* | 9/2011 | Okonogi | F02D 41/20 123/480 |
| 2014/0316679 | A1* | 10/2014 | Nishida | F02D 41/20 701/104 |
| 2015/0102672 | A1* | 4/2015 | Matsumoto | H02M 1/08 307/31 |
| 2017/0138289 | A1* | 5/2017 | Okonogi | F02D 41/20 |

FOREIGN PATENT DOCUMENTS

| | | |
|---|---|---|
| JP | 2011-185157 A | 9/2011 |
| JP | 2014-202147 A | 10/2014 |

\* cited by examiner

CONTROL DEVICE FOR INTERNAL COMBUSTION ENGINE

TECHNICAL FIELD

The present invention relates to a control device for an internal combustion engine.

BACKGROUND ART

Conventionally, in a system for a fuel injection, in one operation cycle of a cylinder of an internal combustion engine, fuel supply is performed by multiple times of fuel injection (multi-stage injection) to a combustion chamber from a fuel injection device having a fuel injection valve electromagnetically driven.

In such a fuel injection device, a boost power supply is generally configured to include a boost circuit including an inductive element and a switching element, and a capacitor which stores the boosted electric power. When the fuel injection valve is energized from the boost power supply, power is supplied by discharge from the capacitor. Therefore, when power is energized from the boost power supply, the voltage drops due to the discharge of the capacitor.

After discharging the capacitor, the power is charged by the boost circuit and returns to a boosted prescribed voltage. However, when the multiple times of injection are performed in a relatively short time, the charge may not be in time for the second and subsequent injections.

In contrast, there is also known a fuel injection device that performs the maximum number of times of executable injection with respect to the requested number of times of injection even when the boosted voltage decreases (see, for example, PTL 1). PTL 1 discloses a configuration in which a boosted voltage obtained by boosting a battery voltage is monitored by an engine controller unit, and when the boosted voltage drops below a set normal voltage, a valve opening time Pi of the fuel injection valve is extended to ensure the drive current necessary for the operation of the fuel injection valve. Thus, a highly reliable fuel injection device is achieved.

CITATION LIST

Patent Literature

PTL 1: Japanese Unexamined Patent Application Publication No. 2011-185157

SUMMARY OF INVENTION

Technical Problem

While the request for multi-stage injection increases year by year, there is a need for a fuel injection in a short period of time in which the charge of the boosted voltage is not in time for the purpose of purifying the exhaust gas. When the next injection is performed before completion of the charge of the boosted voltage, the suction energy of a plunger of a fuel injection valve is lowered due to insufficient boosted voltage, which causes a delay in valve opening of the fuel injection valve, resulting in a large variation in injection quantity.

Particularly, in a low injection pulse range (a range in which the fuel injection pulse width is small), this influence is large, and there is a need for correction control for suppressing the variation in the injection quantity due to the valve opening delay. Also, in the case of performing the injection in which the injection timings are close to each other at the time of multi-stage injection, if the injection timing is delayed in order to secure the charge time of the boosted voltage, even when the requested injection timing is set for the purpose of making the engine output, the purification of the exhaust gas, and the improvement in fuel economy compatible at a high level, it is not possible to perform the fuel injection at a desired timing.

An object of the present invention is to provide a control device for an internal combustion engine which can suppress a variation in fuel injection quantity caused by injection of a boosted voltage during charge, without shifting a requested injection timing, when there is a need for a short-term injection in which the charge of the boosted voltage is not in time.

Solution to Problem

In order to achieve the aforementioned object, the present invention provides a control device including: a battery that supplies a first voltage; a boost circuit that boosts the first voltage and supplies a boosted second voltage; a fuel injection device driven by the second voltage to inject fuel; a switch that turns the second voltage supplied from the boost circuit to the fuel injection device on and off; and a computation device that controls the switch, in which the computation device includes an estimation unit which estimates the second voltage at all fuel injection timings during one combustion cycle, before the initial fuel injection during the one combustion cycle, and a correction unit which corrects a fuel injection quantity at each fuel injection timing depending on the estimated second voltage.

Advantageous Effects of Invention

According to the present invention, it is possible to suppress a variation in fuel injection quantity caused by injection of a boosted voltage during charge, without shifting a requested injection timing when there is a need for a short-term injection in which the charge of the boosted voltage is not in time. The problems, configurations, and effects other than those described above will be clarified by the description of the embodiments below.

DESCRIPTION OF EMBODIMENTS

Figure 1:
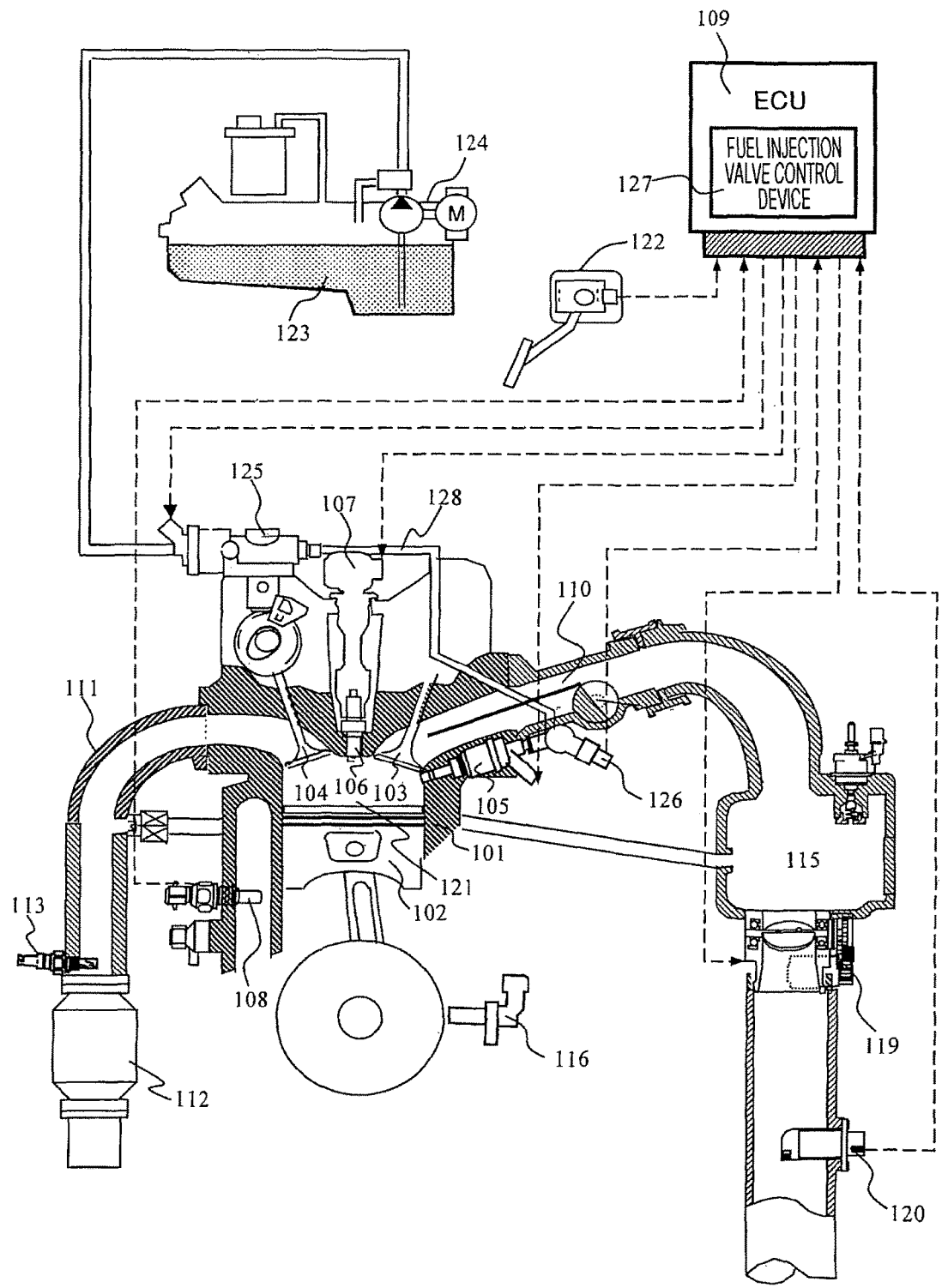
FIG. 1 is a diagram illustrating a basic configuration of a system including an ECU according to an embodiment of the present invention.

Hereinafter, the configuration and operation of a system including an ECU (a control device for an internal combustion engine) according to an embodiment of the present invention will be described with reference to the drawings. FIG. 1 is a diagram illustrating a basic configuration of a system including an ECU according to an embodiment of the present invention.

In FIG. 1, air sucked into an internal combustion engine (101) passes through an air flow meter (AFM) (120), is sucked in the order of a throttle valve (119) and a collector (115), and is thereafter supplied to a combustion chamber (121) via an intake pipe (110) and an intake valve (103) provided in each cylinder.

Meanwhile, the fuel is sent from a fuel tank (123) to a high-pressure fuel pump (125) of the internal combustion engine (101) by a low-pressure fuel pump (124), and the high-pressure fuel pump (125) controls the fuel pressure to a desired pressure, based on the control command value from an engine control unit (ECU) (109). As a result, the high-pressure fuel is sent to the fuel injection valve (105: a fuel injection device) via a high-pressure fuel pipe (128), and the fuel injection valve (105) injects fuel into the combustion chamber (121), based on a command from a fuel injection control device (127) included in the ECU (109).

Further, the internal combustion engine (101) is provided with a fuel pressure sensor (126) which measures the internal pressure of the high-pressure fuel pipe (128) in order to control the high-pressure fuel pump (125). The ECU (109) generally performs a so-called feedback control of setting the fuel pressure in the high-pressure fuel pipe (128) to a desired pressure, based on the sensor value. Furthermore, the internal combustion engine (101) is provided with an ignition coil (107) and a spark plug (106), and has a structure in which an energization control to the ignition coil (107) and an ignition control using the spark plug (106) are performed by the ECU (109) at a desired timing.

As a result, intake air and fuel in the combustion chamber (121) are combusted by a spark emitted from the spark plug (106). The exhaust gas generated by combustion is discharged to an exhaust pipe (111) via an exhaust valve (104), and a three-way catalyst (112) for purifying the exhaust gas is disposed on the exhaust pipe (111).

The ECU (109) has the built-in fuel injection control device (127). Signals of a crank angle sensor (116) for measuring an angle of a crankshaft (not illustrated) of the internal combustion engine (101), an AFM (120) for detecting (measuring) the intake air quantity, an oxygen sensor (113) for detecting the oxygen concentration in the exhaust gas, an accelerator opening degree sensor (122) for detecting the opening degree of an accelerator operated by the driver, and a fuel pressure sensor (126) for detecting the fuel pressure are input to the fuel injection control device (127).

Subsequently, the signals which are input from each sensor will be further described. The ECU (109) calculates the required torque of the internal combustion engine (101) from the signal of the accelerator opening degree sensor (122), and determines whether there is an idle state or the like. The ECU (109) further includes a revolution number detecting unit which computes the rotational speed (hereinafter referred to as the engine speed) of the internal combustion engine from the signal of the crank angle sensor (116), and a unit (determination unit) which determines whether or not the three-way catalyst (112) is in a warmed-up state from the cooling water temperature of the internal combustion engine (101) obtained from the water temperature sensor (108) and the elapsed time after starting the internal combustion engine, and the like.

Further, the ECU (109) calculates the intake air quantity necessary for the internal combustion engine 101 from the above-described required torque, and outputs an opening degree signal corresponding to the intake air quantity to the throttle valve 119. The fuel injection control device (127) calculates the fuel quantity depending on the intake air quantity, outputs the fuel injection signal to the fuel injection valve (105), and further outputs the ignition signal to the ignition coil (107).

Figure 2:
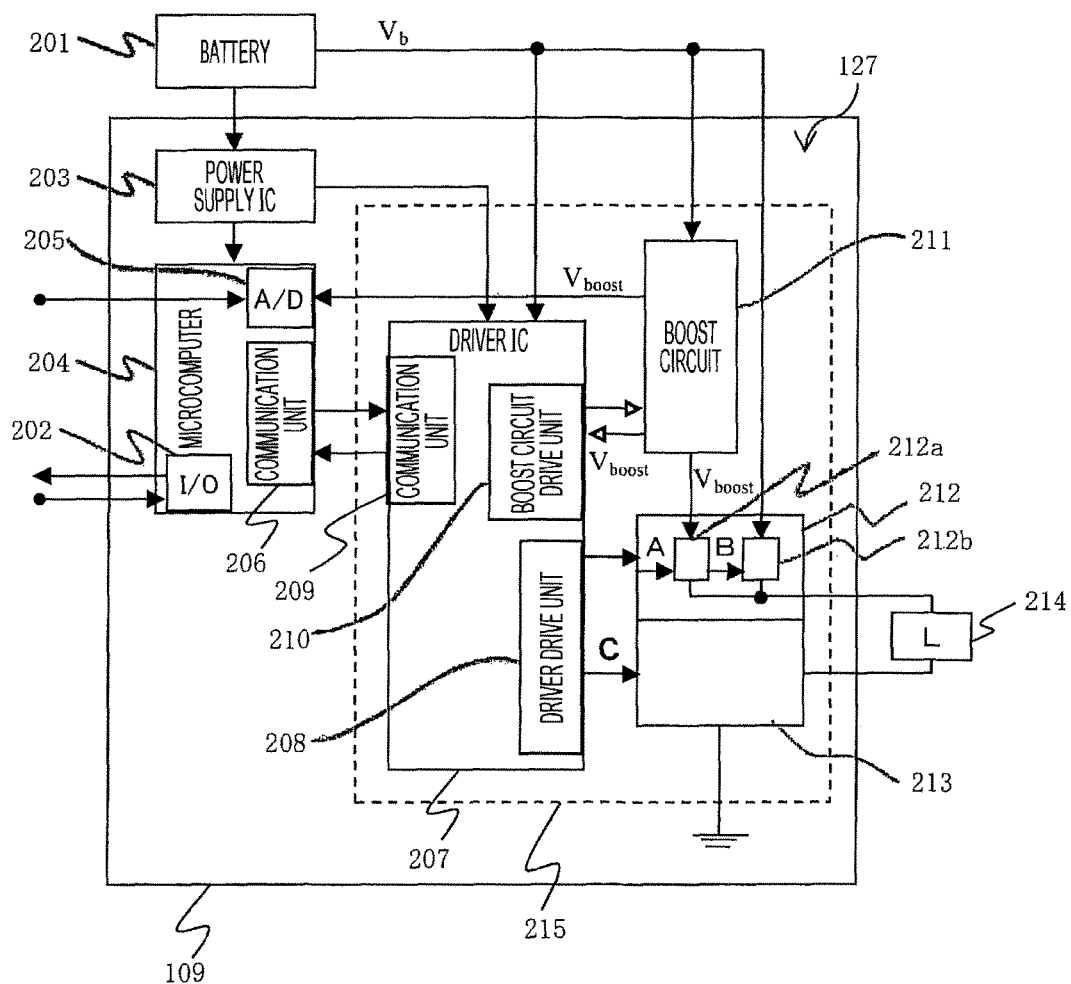
FIG. 2 is a block diagram of the ECU illustrated in FIG. 1.

Next, the configuration of the ECU (109) will be described with reference to FIG. 2. FIG. 2 is a block diagram of the ECU (109) illustrated in FIG. 1. The ECU (109) includes a power supply IC (203), a microcomputer (204), and a fuel injection control circuit (215). The power supply IC (203), the microcomputer (204), and the fuel injection control circuit (215) constitute the fuel injection control device (127).

The fuel injection control circuit (215) is incorporated in the ECU (109), and includes a driver IC (207), a boost circuit (211), an upper driver (212), and a lower driver (213).

The battery voltage from the battery (201), which is a vehicle power supply, is supplied to the ECU (109), and is supplied to the power supply IC (203). Further, the battery voltage Vb is supplied to the driver IC (207) of the fuel injection control circuit (215), the boost circuit (211) for driving the fuel injection device, the upper driver (212) and the like. Voltage is supplied from the power supply IC (203) to the microcomputer (204) as the computation device, the driver IC (207) and the like.

The driver IC (207) of the fuel injection control circuit (215) has a communication unit (209) with a microcomputer (204), a boost circuit drive unit (210), and a driver drive unit (208). The boost circuit drive unit (210) sends a switching signal to the boost circuit (211). The boost circuit (211) boosts the battery voltage Vb depending on the switching signal, and supplies the boosted voltage Vboost to the upper driver (212). Further, the voltage Vboost boosted by the boost circuit (211) is fed-back to the boost circuit drive unit (210) of the driver IC (207). The driver IC (207) determines whether to send the switching signal again.

The voltage Vboost boosted by the boost circuit (211) is fed-back to an A/D converter (205) of the microcomputer (204). The microcomputer (204) can send a signal to the driver IC (207) from the communication unit (206) based on the A/D value.

The microcomputer (204) is able to input and monitor the signals from the fuel pressure sensor or the temperature sensor (including the ambient temperature of the ECU (109), the substrate temperature, and the temperature of the boost circuit) via the A/D converter (205), in addition to the boosted voltage. In addition to this, the microcomputer (204) has an input/output port (202) for driving an external load or monitoring signals from the outside. Although it is not illustrated, the microcomputer (204) has a ROM and a RAM, and has a function capable of storing the set values and the like.

The upper driver (212) of the fuel injection control circuit (215) is provided with a boosted voltage driver (212a) for driving the coil load (214) by the boosted voltage of the boost circuit (211), and a battery voltage driver (212b) for driving the coil load (214) by the battery voltage from the battery 201. The upper driver (212) supplies a current to a coil load (214) of a fuel injection valve or the like having an electromagnetic coil, by a drive signal A and a drive signal B of a driver drive unit (208) of the driver IC (207).

The drive signal A triggers the boosted voltage driver (212a) using the boosted voltage, and the drive signal B triggers the battery voltage driver (212b) using the battery voltage. In addition, the lower driver (213) causes the current from the coil load (214) to flow to the ground potential by the drive signal C of the driver drive unit (208).

At least one of the upper driver (212) and the lower driver (213) has a current detection unit and a terminal voltage detection unit using a shunt resistor or the like, and performs a driver driving control for detecting the current value flowing through the driver and coil load (214) to perform feedback. It is also possible to detect overcurrent to the driver, short-circuit of the terminal, and ground fault by these functions.

Here, in the embodiment, the boost circuit (211), the upper driver (212), and the lower driver (213) are provided separately from the driver IC (207), but these elements may be provided in the driver IC (207). That is, the driver IC (207) may be used for either the driver or the pre-driver.

The upper driver (212) and the lower driver (213) function as switches that turn the boosted voltage supplied from the boost circuit (211) to the coil load (214) of the fuel injection valve (105) on and off. The microcomputer (204) and the driver IC (207) function as a computation device which controls the switch.

Figure 3:
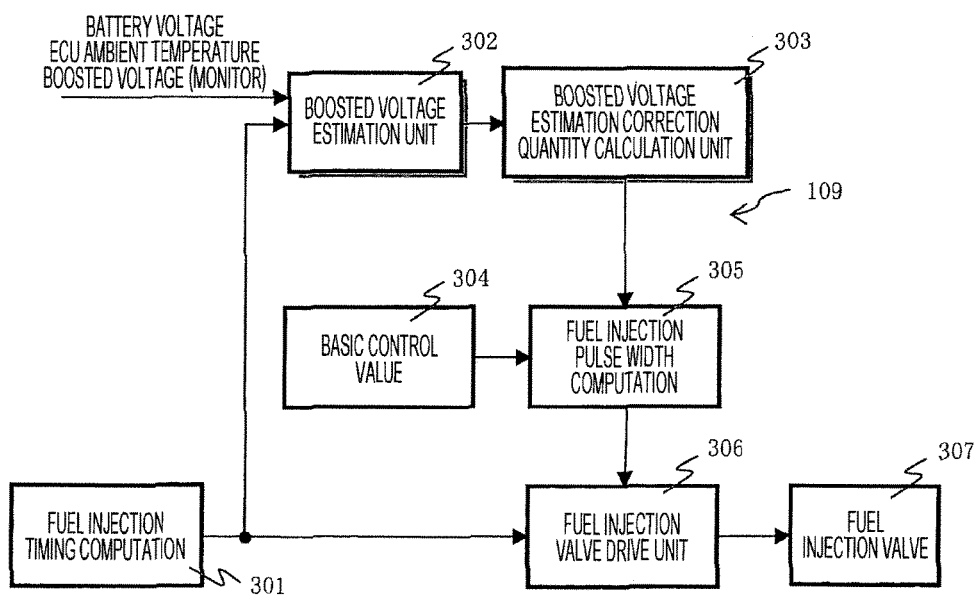
FIG. 3 is an example of a control block diagram of the ECU illustrated in FIG. 1.

Next, a control for correcting the fuel injection pulse width will be described with reference to FIG. 3. FIG. 3 is an example of a control block diagram for correcting the fuel injection pulse width, by the estimated boosted voltage, with respect to the drive control value of the fuel injection valve according to the embodiment of the present invention. The ECU (109) functions as blocks 301 to 306.

The block 301 is a block which computes the fuel injection timing. The block 301 calculates the injection timing for each cylinder, by the conditions such as engine speed, engine water temperature, injection stroke information (information indicating one of intake, compression, combustion and exhaust processes of one combustion cycle).

The block 302 is a block of the boosted voltage estimation unit. From the fuel injection timing for each cylinder, the ambient temperature of the ECU (109), the substrate temperature of the ECU (109), the temperature of the boost circuit, the battery voltage, or the battery voltage average value, the boosted voltage is estimated with the boosted voltage monitored by the boost circuit drive unit (210) as a starting point, and the boosted voltage estimated value is calculated. The calculation method of the boosted voltage estimated value will be described later.

A block 303 calculates a correction quantity to suppress the fuel variation caused by the boosted voltage drop, by the boosted voltage estimated value.

A block 304 calculates basic control values (basic fuel injection pulses) by conditions such as an engine speed, a load, and an engine water temperature.

The block 305 reflects the fuel correction quantity of the boosted voltage estimated value to the basic control value, and computes the injection pulse width. When the multi-stage injection is executed, the block 305 computes the pulse width for multiple injections in accordance with the number of times of multi-stage injections and the division ratio.

A block 306 is a fuel injection valve drive unit. In accordance with the fuel injection timing and the fuel injection pulse width, a drive current is output to the fuel injection valve of a block 307 to execute the fuel injection.

Figure 4:
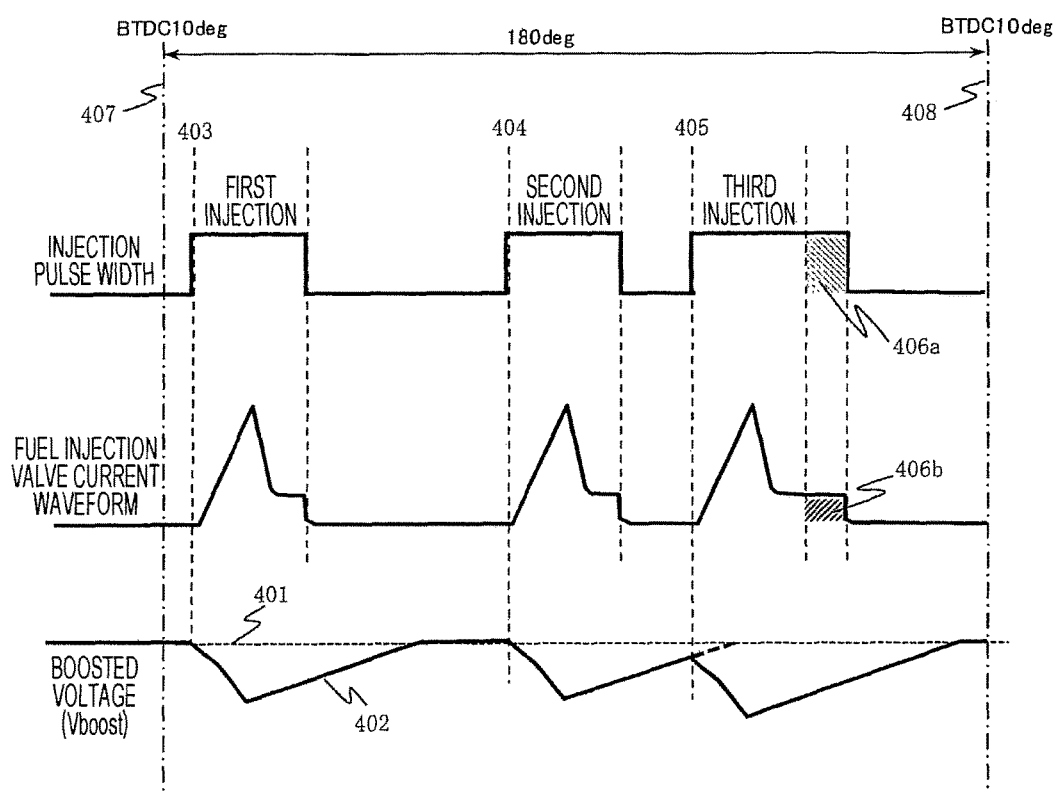
FIG. 4 is a chart illustrating an example of a request operation at the time of multi-stage injection.

Next, a request operation in the multi-stage injection will be described with reference to FIG. 4. FIG. 4 is a chart illustrating an example of a request operation at the time of multi-stage injection. The chart illustrates the injection pulse width, the current waveform of the fuel injection valve, and the boosted voltage (Vboost) in order from the top.

The request operation will be described by taking, as an example, a case where the multi-stage injection of the same cylinder is performed three times during a predetermined period (407 to 408) in one cycle (one combustion cycle). When the power supply is input, the boosted voltage (Vboost) is boosted up to the reference voltage (401), and is kept constant at the reference voltage (401). Here, the reference voltage (401) is a voltage when the boost circuit (211) is fully charged.

As indicated by a solid line (402) of the boosted voltage, the voltage drops by a predetermined quantity per injection at the timing of the first injection (403), the second injection (404), and the third injection (405), and thereafter, the voltage is boosted toward the reference voltage (401). If the boosted voltage is returned to the reference voltage (401) as in the timing of the second injection (404), a stable fuel injection quantity can be injected.

However, if the next injection is performed before the boosted voltage (Vboost) completes the charge up to the reference voltage (401) as in the timing of the third injection (405), the suction energy of the plunger of the fuel injection valve drops due to insufficient boosted voltage and the valve opening of the fuel injection valve is delayed, and thus, the variation in the injection quantity becomes large.

Particularly, in the low injection pulse region, this effect is large, and correction control for suppressing variation in injection quantity due to valve opening delay is required. Also, in the case of performing the injection so that the injection timings are close to each other at the time of multi-stage injection, if the injection timing is delayed so as to secure the charge time of the boosted voltage, the request injection timing is set for the purpose of making the engine output, the purification of the exhaust gas, and the improvement of fuel economy compatible at a high level. However, it is not possible to execute the fuel injection at the desired timing.

Therefore, in order to cope with a case where the next injection is performed before the boosted voltage (Vboost) completes the charge up to the reference voltage (401) as in the timing of the third injection (405), when the fuel injection is performed a plurality of times during a predetermined period (407 to 408) in one cycle, the voltage drop of all the boosted voltages for a plurality of times and the boosted voltage at the injection time, at the timing before initial driving of the fuel injection valve (BTDC 10 deg in 407 of FIG. 4).

By extending the injection pulse width as indicated by the hatched portion of 406a by the estimated boosted voltage, the hatched portion indicated by 406b is also extended for the current waveform of the fuel injection valve. Although the details of the boosted voltage estimation method will be described later, in the present embodiment, it is possible to satisfy the request of a desired injection timing when there is a need for a short-term injection in which the charge of the boosted voltage is not in time, and suppress the variation in fuel injection quantity caused by injection during charge of the boosted voltage.

Here, the microcomputer (204) functions as a correction unit that corrects to increase the fuel injection pulse width when the estimated boosted voltage is smaller than the reference voltage. This makes it possible to suppress a decrease in the fuel injection quantity.

Figure 5:
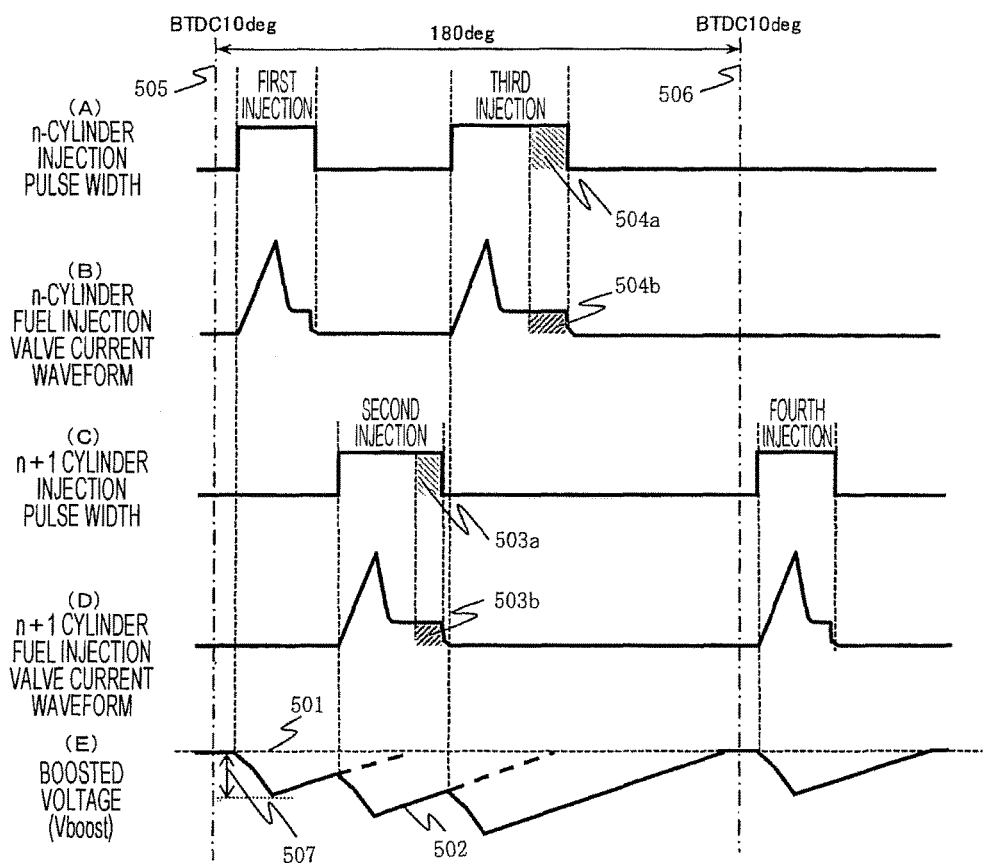
FIG. 5 is a chart illustrating another example of a request operation at the time of multi-stage injection.

Next, another request operation in the multi-stage injection will be described with reference to FIG. 5. FIG. 5 is a chart illustrating an example different from that of FIG. 4, as a request operation in the multi-stage injection. In the cart, (A) n-cylinder injection pulse width, (B) n-cylinder fuel injection valve current waveform, (C) n+1 cylinder injection pulse width, (D) n+1 cylinder fuel injection valve current waveform, and (E) boosted voltage (Vboost) are sequentially illustrated from above.

FIG. 5 illustrates a case where, in the combination of different cylinders of (A) and (C), the multi-stage injection is performed three times in the stroke of the crank angle of 180 deg in the predetermined period (505 to 506) in one cycle and is performed once in the next stroke.

In a case where the first injection and the second injection are in close proximity with each other, and the second injection and third injection are in close proximity with each other, and the next injection is executed before the (E) boosted voltage (Vboost) is charged up to the reference voltage (501), as indicated by a solid line (502), the boosted voltage further decreases at the second injection rather than the first injection and at the third injection rather than the second injection.

In a case where the boosted voltage at the time of fuel injection is lower than the reference voltage (501), the fuel injection quantity decreases. Therefore, in the hatched portions indicated by 503*a* of the second injection and 504*a* of the third injection, the fuel increase quantity correction of the injection pulse width is performed, depending on the boosted voltage estimated value. With the correction of the injection pulse width, the hatched portions indicated by 503*b* of the current waveform (D) and 504*b* of the current waveform (B) of the fuel injection valve are extended.

Also, in the fourth injection, since the boosted voltage is returned to the reference voltage (501), the correction to the injection pulse width of the fourth injection is not performed. The calculation of the boosted voltage drop quantity (507) and the drop time per single fuel injection valve drive will be described with reference to FIG. 6.

Figure 6:
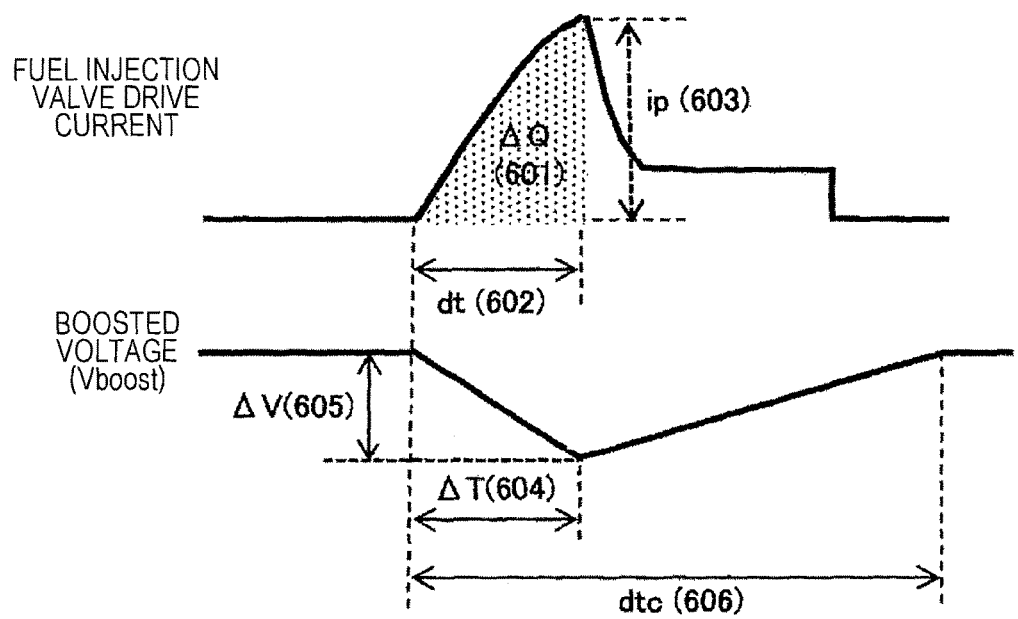
FIG. 6 is a chart illustrating a relation between a drive current of a fuel injection valve, a boosted voltage, and a restoration reference time.

FIG. 6 is a chart illustrating a relation between the drive current of the fuel injection valve, the boosted voltage, and the restoration reference time.

The charge ΔQ (601) consumed when driving a single fuel injection valve is represented by the area of a substantially triangular shape illustrated in FIG. 6. ΔQ is calculated from dt (602) and ip (603) by the following formula (1).

$$\Delta Q = dt \times ip/2 \tag{1}$$

dt (602) is the time until the drive current of the fuel injection valve flows and thereafter reaches the peak current, and is equivalent to the drop time ΔT (604) of the boosted voltage (Vboost). dt (602) is set by two or more of the battery voltage, the battery voltage average value, the ambient temperature of ECU, the substrate temperature of ECU, or the temperature of boost circuit. Here, the battery voltage average value is supposed to suppress the fluctuation of the battery voltage, by multiplying the battery voltage by a weighted average filter.

ip (603) is the peak current of the fuel injection valve, which is preset depending on the fuel pressure to be used and the like. Further, ip (603) is the maximum value of the drive current supplied to the fuel injection device.

From the charge calculation formula (Q=CV), the boosted voltage drop quantity ΔV (605) per driving of single fuel injection valve can be calculated by the following formula (2). (ΔV is referred to as boosted voltage drop quantity)

$$\Delta V = \Delta Q/C \tag{2}$$

Here, ΔV represents the drop quantity of the boosted voltage when the fuel injection device performs the fuel injection once in a state in which the boost circuit (211) is fully charged.

The electrostatic capacity: C is defined depending on the capacitor used in the boost circuit (211), but since the capacitor includes variations due to temperature, it is preferable to correct the electrostatic capacity by the temperature sensor. When the two fuel injection valves are driven at the same time from the charge calculation formula, since the charge ΔQ (601) consumed is doubled, the boosted voltage drop quantity ΔV (605) is also doubled. Further, dtc (606) is the restoration reference time, and the current (ic) charged to the boost circuit can be calculated by the following formula (3).

$$ic = \Delta Q/dtc \tag{3}$$

From the charge calculation formula, the above formula (3) can be converted to the following formula (4).

$$\Delta V = ic \times dtc/C \tag{4}$$

If the charged current (ic) and the electrostatic capacity (C) are assumed to be fixed values, when the boosted voltage drop quantity ΔV (605) is doubled, the restoration reference time: dtc (606) is also doubled.

Here, dtc (606) represents the time until the boost circuit (211) is fully charged, after the boosted voltage starts to drop when the fuel injecting device performs the fuel injection once in a state in which the boost circuit (211) is fully charged.

Next, details of the method of calculating the boosted voltage estimated value according to the embodiment of the present invention will be described.

In order to correctly correct variations in the fuel injection quantity at the time of the multi-stage injection, it is necessary to grasp the drop quantity of the boosted voltage in real time. However, the restoration operation from the drop of the boosted voltage due to the fuel injection to the reference voltage is several hundred is to several ms, and monitoring in real time is not preferable because the computation load of the microcomputer increases.

Therefore, in the present embodiment, the boosted voltage at the aforementioned boost circuit drive unit (210) is read per each cylinder by performing A/D (analog signal to digital signal conversion), before a predetermined period (timing of 407 in FIG. 4 and timing of 505 in FIG. 5). The monitored value of the boosted voltage is hereinafter referred to as a boosted voltage AD value.

In the present embodiment, the boosted voltage estimated value V^ is calculated by the following formula (5).

$$V^{\wedge} = (Vad + C1) - \Delta V \times N + \Delta V \times (T\text{sum} - dt)/(dtc - dt) \tag{5}$$

Here, Vad is the AD value of the boosted voltage at the timing corresponding to a predetermined crank angle (for example, BTDC 10 deg). C1 is a correction quantity at the time of initial drop to be described later. ΔV is a value calculated from the formulas (1) and (2). dtc (606) is the aforementioned restoration reference time. Tsum is the boosted voltage restoration time, which is calculated by the following formula (6).

$$T\text{sum} = \Sigma(T_{k+1} - T_k) \ (k=1,2,\ldots,4) \tag{6}$$

Here, $T_k$ is the timing of the k-th fuel injection after storing the AD value of the boosted voltage.

Before the initial fuel injection in one combustion cycle, the microcomputer (204) functions as an estimation unit that estimates the boosted voltage at all the fuel injection timings during one combustion cycle. In the present embodiment, the microcomputer (204) estimates the boosted voltage at the fuel injection timing, on the basis of the boosted voltage drop quantity ΔV, a time dt (602) until reaching the peak current ip (603), a restoration reference time dtc (606), and the number N of times of the fuel injections during one fuel cycle. As a result, boosted voltage can be easily estimated.

Further, the maximum value of the boosted voltage estimated value V^ sets the reference voltage as the upper limit. The reference voltage in the present embodiment is a boosted voltage monitored after the initial power input of a vehicle power source (battery) and before the fuel injection, and is stored in the microcomputer (204). That is, the reference voltage is the voltage of the boost circuit (211) measured before the fuel injection device performs the fuel injection after turning the ignition switch from OFF to ON. Therefore, the accuracy of the reference voltage can be secured.

The formula for calculating the boosted voltage restoration time Tsum is assumed to be a case where the number of times of the multi-stage injection is set to a maximum of 5. However, the calculation formula (6) may be changed depending on the maximum number of multi-stage injections.

Further, in the formula (5) for calculating the boosted voltage estimated value V^, the restoration reference time dtc (606) sets the actual measurement value of the restoration reference time of the boosted voltage. The restoration reference time of the boosted voltage will be described with reference to FIG. 7.

Figure 7:
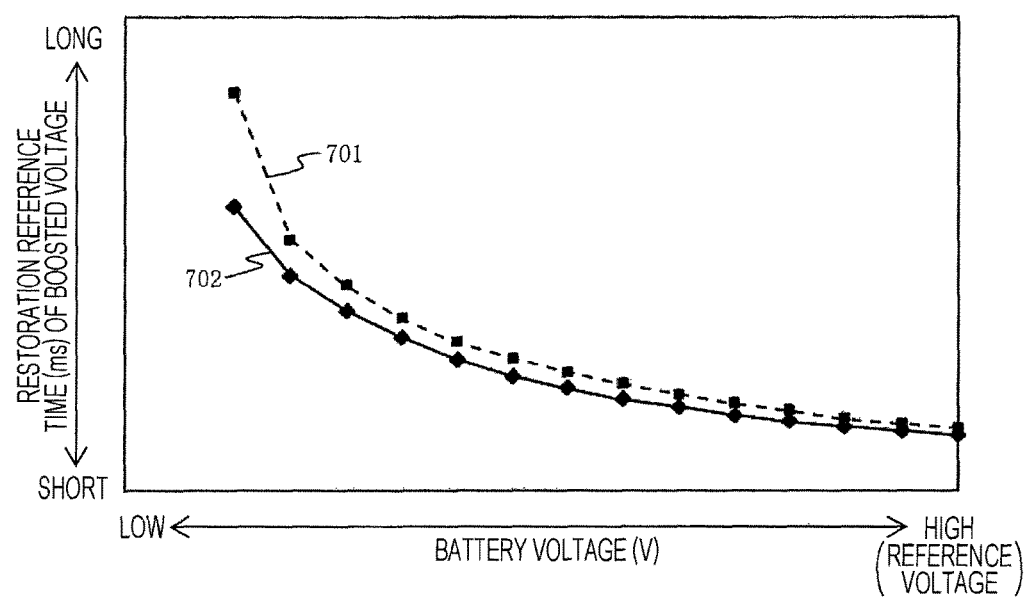
FIG. 7 is a chart illustrating a relation between the battery voltage and the restoration reference time of the boosted voltage.

FIG. 7 is a chart illustrating a relation between the battery voltage and the restoration reference time of the boosted voltage. 701 illustrates a case where the ECU substrate temperature is a high temperature, and 702 illustrates a case where the ECU substrate temperature is a low temperature. This represents that the restoration reference time dtc (606) becomes longer as the battery voltage becomes lower and the ECU substrate temperature becomes higher. Although the ECU substrate temperature is used here, any one or more of the ambient temperature of the ECU or the temperature of the boost circuit may be used. Although the battery voltage is used here, it may be an average value of the battery voltage. Therefore, the influence of fluctuation of the battery voltage can be eliminated.

Here, the microcomputer (204) sets a restoration reference time dtc (606) depending on the battery voltage and the temperature of the ECU (109) (the ambient temperature of the ECU, the substrate temperature of the ECU or the temperature of the boost circuit). For example, the microcomputer (204) previously stores a restoration reference time dtc (606) corresponding to the battery voltage and the temperature of the ECU (109). This improves the accuracy of estimating the boosted voltage.

Specifically, the microcomputer (204) sets the restoration reference time so that the restoration reference time dtc (606) increases with a decrease in the battery voltage, and sets the restoration reference time so that the restoration reference time dtc (606) increases with an increase in the temperature of the ECU. Thus, it is possible to estimate the boosted voltage in consideration of the influence of the battery voltage and the temperature of the ECU on charging of the boost circuit.

Further, in the formula (5) for calculating the boosted voltage estimated value, the correction quantity C1 at the time of the initial drop is calculated by the following formula (7).

$$C1 = \Delta V \times (T_0 - dt)/(dtc - dt) \quad (7)$$

Here, $T_0$ is the time from the TDC to the initial injection.

The reflection of the correction quantity C1 at the time of the initial drop on the boosted voltage estimated value V^ will be described. At the timing (407 or 505) before the predetermined period, it is determined whether or not the boosted voltage AD value is in the vicinity of the reference voltage. Specifically, the boosted voltage AD value is compared with the reference voltage. When the boosted voltage AD value is in the vicinity of the reference voltage (boosted voltage AD value≈reference voltage), the fuel correction at the time of the initial drop of the boosted voltage is invalidated (C1=0). Conversely, when the boosted voltage AD value is lower than the reference voltage (boosted voltage AD value<reference voltage), the correction quantity C1 at the time of initial drop obtained from the calculation formula (7) is reflected on the boosted voltage estimated value V^.

Estimated values of the boosted voltage can be obtained by each means (each unit) explained so far.

Next, the calculation means (calculation unit) of the injection pulse width and the boosted voltage estimate correction will be described. The boosted voltage estimated correction is individually calculated for all the number of times of fuel injection within a predetermined period at the timing before the predetermined period. The cylinder specific injection pulse width is calculated by the following formula (8).

Cylinder specific injection pulse width=basic control value (304)×division ratio×fuel pressure correction coefficient×boosted voltage estimated correction+invalid pulse width  (8)

The boosted voltage estimation correction is a correction quantity in which the boosted voltage estimated correction quantity (corresponding to the maximum number of times of injections of the multi-stage injection) within one stroke (180 deg) is distributed, on the basis of information on the injection cylinder (injection timing of each cylinder) and the number of times of injection. Since the drop quantity of the fuel injection quantity also increases as the drop quantity of the boosted voltage increases due to injection during charge of the boosted voltage, setting is made so as to suppress the decrease in the fuel injection quantity. A specific setting example is illustrated in FIG. 8.

Figure 8:
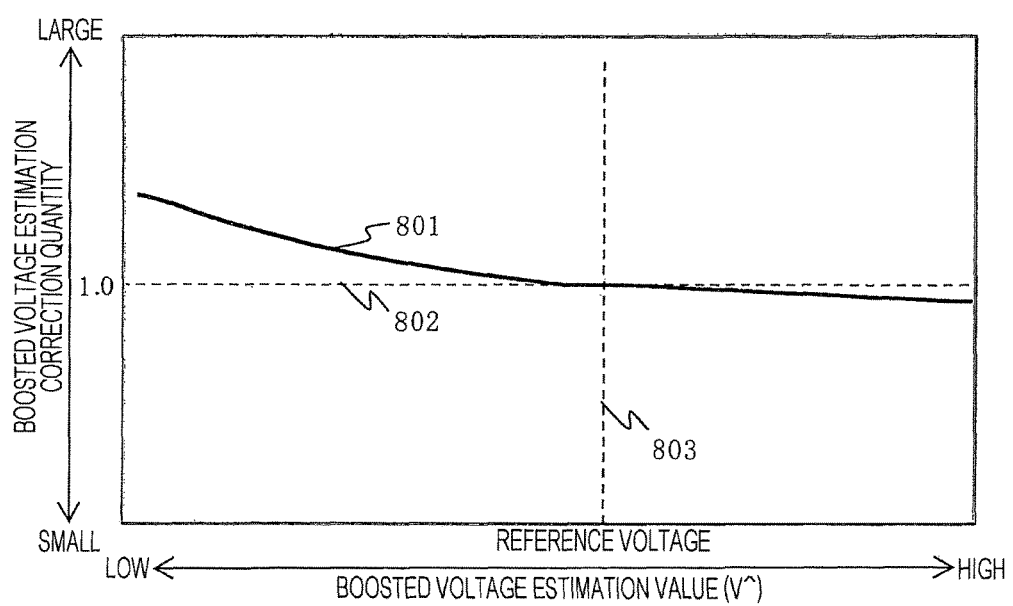
FIG. 8 is a chart illustrating a relation between a boosted voltage estimated value and a boosted voltage estimated correction quantity according to an embodiment of the present invention.

FIG. 8 is a chart illustrating a relation between the boosted voltage estimated value and the boosted voltage estimated correction quantity according to an embodiment of the present invention. A solid line of 801 is a boosted voltage estimated correction quantity, and as the boosted voltage decreases, the correction quantity increases to prolong the fuel injection pulse width.

Meanwhile, this is an example in which the correction quantity is set so that the correction quantity decreases and the fuel injection pulse width is reduced in the region in which the boosted voltage is higher than the reference voltage (803). Here, the microcomputer (204) functions as a correction unit that performs the correction so as to reduce the fuel injection pulse width when the boosted voltage is larger than the reference voltage. Accordingly, it is possible to suppress an increase in the fuel injection quantity.

A dotted line of 802 indicates that the boosted voltage estimation correction quantity is invalid when the boosted voltage is fully charged near the reference voltage (803), and the extension and contraction correction of the injection pulse width are not performed. In the present embodiment, since the correction is performed by multiplying the injection pulse width by the boosted voltage estimation correction, the boosted voltage estimation correction quantity is substantially invalid in 1.0.

Here, the microcomputer (204) functions as a correction unit that corrects the fuel injection quantity at each fuel injection timing depending on the estimated boosted voltage. In the present embodiment, the microcomputer (204) estimates the boosted voltage at all the fuel injection timings during one combustion cycle for all the cylinders, before the initial fuel injection during one combustion cycle of a certain cylinder. Thus, it is possible to estimate the boosted voltage in consideration of the multi-stage injection of one cylinder as well as the multi-stage injection of other cylinders.

Figure 9:
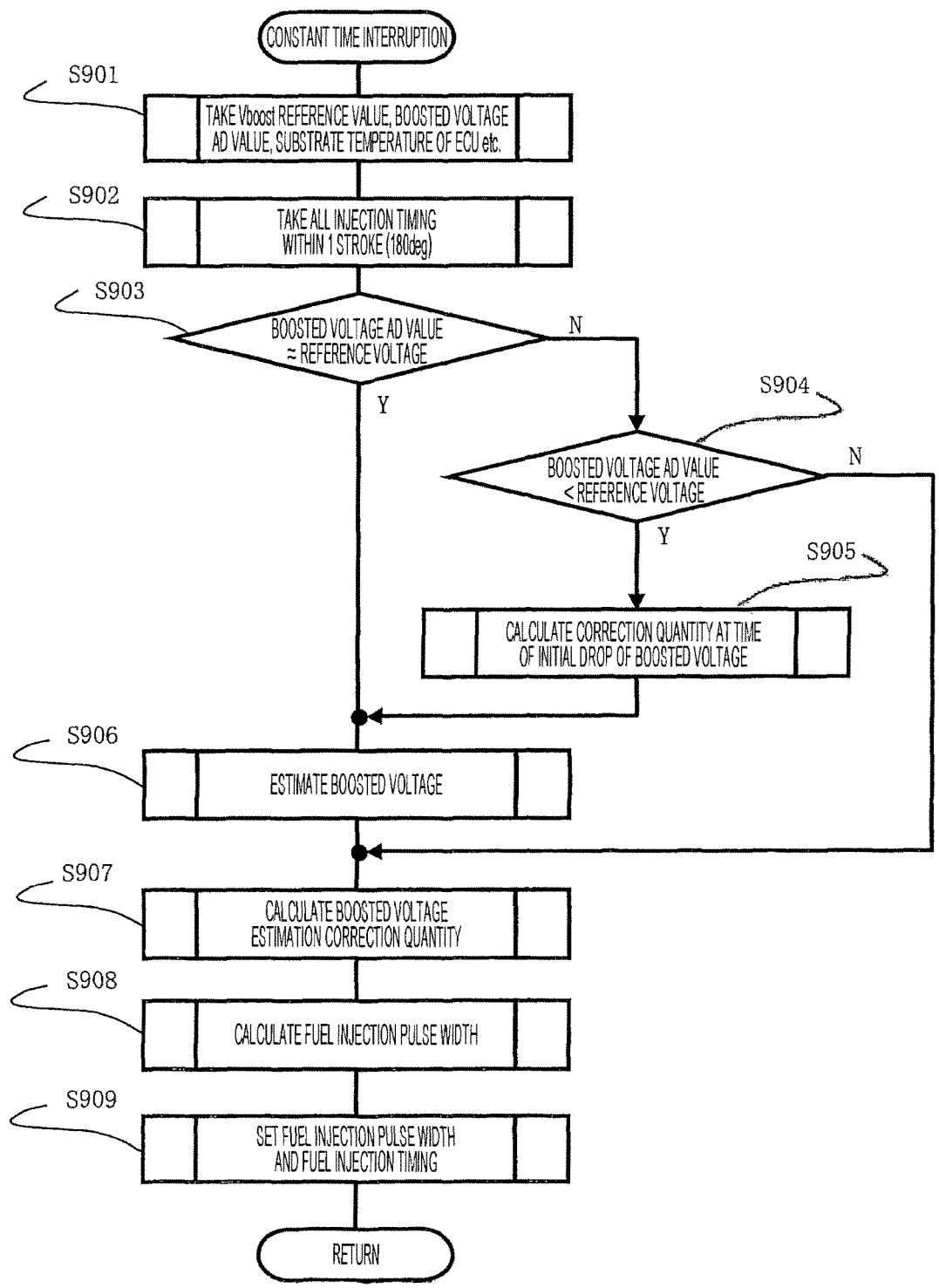
FIG. 9 is a flowchart of the fuel injection control according to an embodiment of the present invention.

Next, the operation of the fuel injection control will be described with reference to FIG. 9. FIG. 9 is a flowchart of the fuel injection control according to an embodiment of the present invention. According to this flow, the microcomputer (204) performs computation by interruption at every predetermined crank angle (for example, BTDC 10 deg).

In step S901, the microcomputer (204) takes in the input parameters such as the aforementioned reference voltage, the boosted voltage AD value, the substrate temperature of the ECU, the ambient temperature of the ECU, the temperature of the boost circuit, the battery voltage, and the battery voltage average value. In step S902, the microcomputer (204) takes in the injection timings for all the number of times of fuel injection within one stroke (180 deg). Next, in step S903, the microcomputer (204) determines whether or not it is necessary to calculate a correction quantity at the time of initial drop of the boosted voltage.

That is, the microcomputer (204) determines whether or not the boosted voltage AD value is equal to the reference voltage. For example, when the difference between the boosted voltage AD value and the reference voltage is equal to or less than the predetermined threshold value, the microcomputer (204) determines that the boosted voltage AD value is equal to the reference voltage.

If the condition of the boosted voltage AD value≈the reference voltage is satisfied, the microcomputer (204) proceeds to step S906. When the condition in step S903 is not satisfied, the microcomputer (204) proceeds to step S904. When the condition of the boosted voltage AD value<the reference voltage is satisfied (S904; YES), the microcomputer (204) calculates the correction quantity C1 at the time of the initial drop of the boosted voltage value in step S905. Meanwhile, the microcomputer (204) proceeds to step S907 when the condition in step S904 is not satisfied (boosted voltage AD value>reference voltage).

In step S906, the microcomputer (204) calculates the boosted voltage estimated value V^ by the boosted voltage AD value, the injection timing, and the correction quantity C1 at the time of the initial drop. In calculating the boosted voltage estimated value V^, the restoration reference time dtc (606) of the boosted voltage is set by at least two of the substrate temperature of the ECU, the ambient temperature of the ECU, the temperature of the boost circuit, the battery voltage, or the battery voltage average value.

Next, in step S907, the microcomputer (204) calculates the boosted voltage estimated correction quantity as illustrated in FIG. 8, by the boosted voltage estimated value V^ or the boosted voltage AD value. Here, since the boosted voltage estimated value V^ has the reference voltage as the upper limit value, in a case where the process proceeds to step S907 by non-satisfaction of the condition of step S904 (boosted voltage AD value>reference voltage), the ECU (109) replaces the horizontal axis of FIG. 8 with the boosted voltage AD value from the boosted voltage estimated value to calculate the boosted voltage estimated correction quantity.

In step S908, the microcomputer (204) calculates the fuel injection pulse width by reflecting the boosted voltage estimated correction quantity in the basic control value. Next, in step S909, the calculated fuel injection pulse width and the fuel injection timing are set in the injection driver, and the injection driver is configured to output the drive current to control the fuel injection valve.

As described above, according to the present embodiment, when the short-term injection in which the charge of the boosted voltage is not in time is requested, without delaying the requested injection timing, it is possible to suppress variations in the fuel injection quantity due to injection during charge of the boosted voltage.

The present invention is not limited to the above-described embodiment, and includes various modified examples. For example, the above-described embodiments have been described in detail in order to explain the present invention in an easy-to-understand manner, and are not necessarily limited to those having all the configurations described. Further, a part of the configuration of an embodiment can be replaced by the configuration of another embodiment, and the configuration of another embodiment can be added to the configuration of an embodiment. Further, it is possible to add, delete, and replace other configurations with respect to a part of the configuration of each embodiment.

For example, the microcomputer (204) may estimate the boosted voltage at the fuel injection timing, based on the quantity of electric power to be supplied to the boost circuit (211), the quantity of electric power consumed when the fuel injection device performs the fuel injection once, and the number of times of fuel injection during one combustion cycle. As a result, boosted voltage can be estimated from the quantity of electric power.

Further, the microcomputer (204) may estimate the boosted voltage at the fuel injection timing, based on the boosted voltage at the predetermined timing before the initial fuel injection during one combustion cycle, the rate of change in the boosted voltage when the fuel injection device performs the fuel injection once, the rate of change in the boosted voltage when the boost circuit (211) is charged after the fuel injection device performs the fuel injection once, and the number of times of fuel injection during one combustion cycle. Thus, the boosted voltage can be estimated from the rate of change (slope) of the boosted voltage.

Further, each of the aforementioned configurations, functions, processing units, processing means, and the like may be achieved by hardware, for example, by designing some or all of them with an integrated circuit or the like. In addition, each of the above-described configurations, functions, and the like may be achieved by software by interpreting and executing a program in which the processor achieves each function. Information on a program, a table, a file, and the like that achieves each function can be stored in a storage device such as a memory, a hard disk and an solid state drive (SSD), or a recording medium such as an IC card, an SD card and or a DVD.

REFERENCE SIGNS LIST 101 engine
106 fuel injection valve

109 ECU (engine control unit)
201 battery
207 fuel injection control circuit
211 boost circuit
212a boosted voltage driver
212b battery voltage driver
214 coil load

The invention claimed is:

1. A control device for an internal combustion engine, the control device comprising:
   a boost circuit configured to boost a first voltage supplied from a battery and to supply a boosted variable second voltage to a fuel injection device;
   a switch configured to selectively turn the second voltage supplied from the boost circuit to the fuel injection device on and off; and
   a processing device comprising at least one of a microcomputer and an integrated circuit, and configured to:
      control the switch;
      estimate a value of the second voltage at each of a plurality of fuel injection timings for a plurality of fuel injections during one combustion cycle, before an initial fuel injection of the plurality of fuel injections during the one combustion cycle; and
      correct a fuel injection quantity at each of the plurality of fuel injection timings based on the estimated second voltage,
   wherein the processing device is further configured to estimate the second voltage at the fuel injection timing, based on a boosted voltage drop quantity indicating a drop quantity of the second voltage when the fuel injection device performs, in a state in which the boost circuit is fully charged, the fuel injection once, a time to reach a peak current which is a maximum value of a drive current after the drive current is supplied to the fuel injection device, a restoration reference time indicating a time until the boost circuit is fully charged after the second voltage starts to drop when the fuel injection device performs the fuel injection once in a state in which the boost circuit is fully charged, and a number of times fuel injection is performed during the one combustion cycle.

2. The control device for the internal combustion engine according to claim 1, wherein the processing device is further configured to estimate the second voltage at each of the fuel injection timings during the one combustion cycle for each of a plurality of cylinders.

3. The control device for the internal combustion engine according to claim 1, wherein the processing device is further configured to estimate the second voltage at the fuel injection timings, based on the second voltage at a predetermined timing before the initial fuel injection during the one combustion cycle.

4. The control device for the internal combustion engine according to claim 1, wherein the processing device is configured to set the restoration reference time depending on the first voltage and a temperature of the control device.

5. The control device for the internal combustion engine according to claim 4, wherein the temperature of the control device is a substrate temperature of the control device or a temperature of the boost circuit.

6. The control device for the internal combustion engine according to claim 1, wherein the processing device is configured to set the restoration reference time, depending on an averaged value of the first voltage.

7. The control device for the internal combustion engine according to claim 4, wherein the processing device is configured to set the restoration reference time such that that the restoration reference time increases as the first voltage decreases, and the processing device is configured to set the restoration reference time such that that the restoration reference time increases as the temperature of the control device increases.

8. The control device for the internal combustion engine according to claim 1, wherein the processing device is configured to correct the fuel injection quantity to increase a fuel injection pulse width, in a case where the estimated second voltage is smaller than a reference voltage indicating a value of the second voltage when the boost circuit is fully charged.

9. The control device for the internal combustion engine according to claim 8, wherein the reference voltage is a voltage of the boost circuit which is measured before the fuel injection device injects fuel, after turning an ignition switch from off to on.

10. The control device for the internal combustion engine according to claim 8, wherein the processing device is configured to correct the fuel injection quantity to decrease the fuel injection pulse width, in a case where the second voltage is larger than the reference voltage, and the reference voltage indicates a value of the second voltage when the boost circuit is fully charged.

* * * * *